United States Patent
Steele

(10) Patent No.: US 11,514,141 B2
(45) Date of Patent: Nov. 29, 2022

(54) DYNAMICALLY VARYING IDENTIFIERS FOR GEOCACHING

(71) Applicant: Auxiliary Teams Inc., Denver, CO (US)

(72) Inventor: Jacin John Steele, Highlands Ranch, CO (US)

(73) Assignee: VERICACHE, INC., Denver, CO (US)

( * ) Notice: Subject to any disclaimer, the term of this patent is extended or adjusted under 35 U.S.C. 154(b) by 461 days.

(21) Appl. No.: 16/698,266

(22) Filed: Nov. 27, 2019

(65) Prior Publication Data

US 2020/0175140 A1 Jun. 4, 2020

Related U.S. Application Data

(60) Provisional application No. 62/773,032, filed on Nov. 29, 2018.

(51) Int. Cl.
*A63F 13/216* (2014.01)
*A63F 13/85* (2014.01)
*G06F 21/31* (2013.01)
*A63F 13/65* (2014.01)

(52) U.S. Cl.
CPC ............ *G06F 21/31* (2013.01); *A63F 13/216* (2014.09); *A63F 13/65* (2014.09)

(58) Field of Classification Search
None
See application file for complete search history.

(56) References Cited

U.S. PATENT DOCUMENTS

| | | | |
|---|---|---|---|
| 2014/0278946 A1* | 9/2014 | Powell | G06Q 30/0248 705/14.47 |
| 2015/0089158 A1* | 3/2015 | Aist | G06Q 30/0261 711/144 |
| 2015/0262208 A1* | 9/2015 | Bjontegard | G06Q 30/0205 705/7.31 |

* cited by examiner

*Primary Examiner* — Damon J Pierce
(74) *Attorney, Agent, or Firm* — Dorsey & Whitney LLP

(57) ABSTRACT

A method for verifying a discovery of a geocache positioned at one or more physical locations is disclosed. The method comprises providing a first location information corresponding to a first geocache located at a first physical position; receiving from a user device a target credential corresponding to the geocache, wherein the target credential comprises a dynamically varying identifier associated with the geocache; determining a validation credential associated with the geocache; comparing the target credential with the validation credential; and determining whether the geocache was discovered.

16 Claims, 6 Drawing Sheets

DYNAMICALLY VARYING IDENTIFIERS FOR GEOCACHING

CROSS-REFERENCE TO RELATED APPLICATIONS

This application claims the benefit of priority pursuant to 35 U.S.C. § 119(e) of U.S. provisional patent application No. 62/773,032, filed 29 Nov. 2018, entitled "DYNAMICALLY VARYING IDENTIFIERS FOR GEOCACHING," which is hereby incorporated by reference herein in its entirety.

FIELD

The present disclosure relates generally to geocaching, and more specifically to systems and methods to verify geocache discoveries.

BACKGROUND

Geocaching is a recreational activity where participants hide and seek containers, called caches or geocaches, at locations throughout the world. Both hiders (organizers) and seekers use a Global Positioning System (and/or the Russian equivalent, Glonass) receiver and other navigational techniques to place and find geocaches. A typical geocache may include a small weather-resistant container holding a log book, writing utensil, ink stamps, small trinkets or toys, or the like. Seekers who find a cache may take one of the trinkets in exchange for one of their own. Trinkets are usually novelty items of little monetary value, and may be personalized to the hider or the seeker, such as a signature pin or coin. Seekers may sign the log book with a name, pseudonym, or handle, to prove that they actually found the cache.

However, conventional finding verification methods are subject to error, fraud, and are difficult to implement. For example, with log books, the organizer must routinely visit the geocache location to retrieve and inspect the log book, which is time-consuming and delays the verification that a user has found the cache. Further, manual log book entries can be forged, illegible, damaged due to environmental factors (e.g., moisture, mold, exposure to bright sunlight), or the cache could be lost, damaged or destroyed altogether, before the log book is retrieved.

In addition to the manual log book, other verification methods have been used. One example is a photo verification where successful seekers take a picture of themselves at the geocache location and email it to the organizer for verification. Similarly, some organizers have included a webcam positioned at the cache location, requiring finders to capture their image from the webcam for verification. Another example includes an embedded portable non-volatile memory device, such as a USB, Secure Digital (SD) or similar drive, stored at the cache location where the finder can transfer the file to their personal devices and the file is used for separate verification.

The above examples can be difficult to implement, administer, and are subject to fraud and other errors. For example, photo verification may require user intervention, is time consuming, subject to forgery, and difficult to automate, e.g., a user can use editing tools to insert a picture of themselves into pictures from successful seekers at the location. Also, often seekers may be by themselves and capturing a photograph with the requisite background and themselves in the frame can be difficult without a second person to assist. As to the webcam or other monitoring video tool implementations, this generally requires electricity and Internet access, which can be difficult because typical geocaches are placed in remote locations without access to power or Internet. Further, portable non-volatile memory devices can introduce security concerns for users connecting a device such as a computer, tablet, mobile phone or other computing device to the drive, especially given that the cache is unattended or unsecured, meaning hostile third parties could download malware or the like onto the device. The file can also be easily transmitted between various users, allowing possible verification of a cache find for those not physically present. Additionally, such devices typically include exposed electrical contacts subject to corrosion and damage.

SUMMARY

A method for verifying a discovery of a geocache positioned at one or more physical locations is disclosed. The method comprises providing a first location information corresponding to a first geocache located at a first physical position; receiving from a user device a target credential corresponding to the geocache, wherein the target credential comprises a dynamically varying identifier associated with the geocache; determining a validation credential associated with the geocache; comparing the target credential with the validation credential; and determining whether the geocache was discovered.

A system for verifying a discovery of a geocache positioned at one or more physical locations is disclosed. The system comprises a first geocache containing a verifier that generates a dynamically varying identifier associated with the geocache; a user device that stores information related to the dynamically varying identifier, and generates a target credential; and a server that receives the target credential, determine a validation credential associated with the geocache; compare the target credential with the validation credential; and determine whether the geocache was discovered.

A game including verifying a discovery of a geocache positioned at one or more physical locations is disclosed. The game comprises: a geocache containing a verifier, the verifier is configured to generate a dynamically varying identifier associated with the geocache; a device configured to capture the identifier, and generate a target credential; a network in communication with the user device, the network configured to transmit the target credential; a server in communication with the network, the server configured to receive the target geocache credential, determine a validation credential associated with the geocache; compare the target credential with the validation credential; determine whether the geocache was discovered; and award a virtual or physical game resource.

SPECIFICATION

Figure 1:
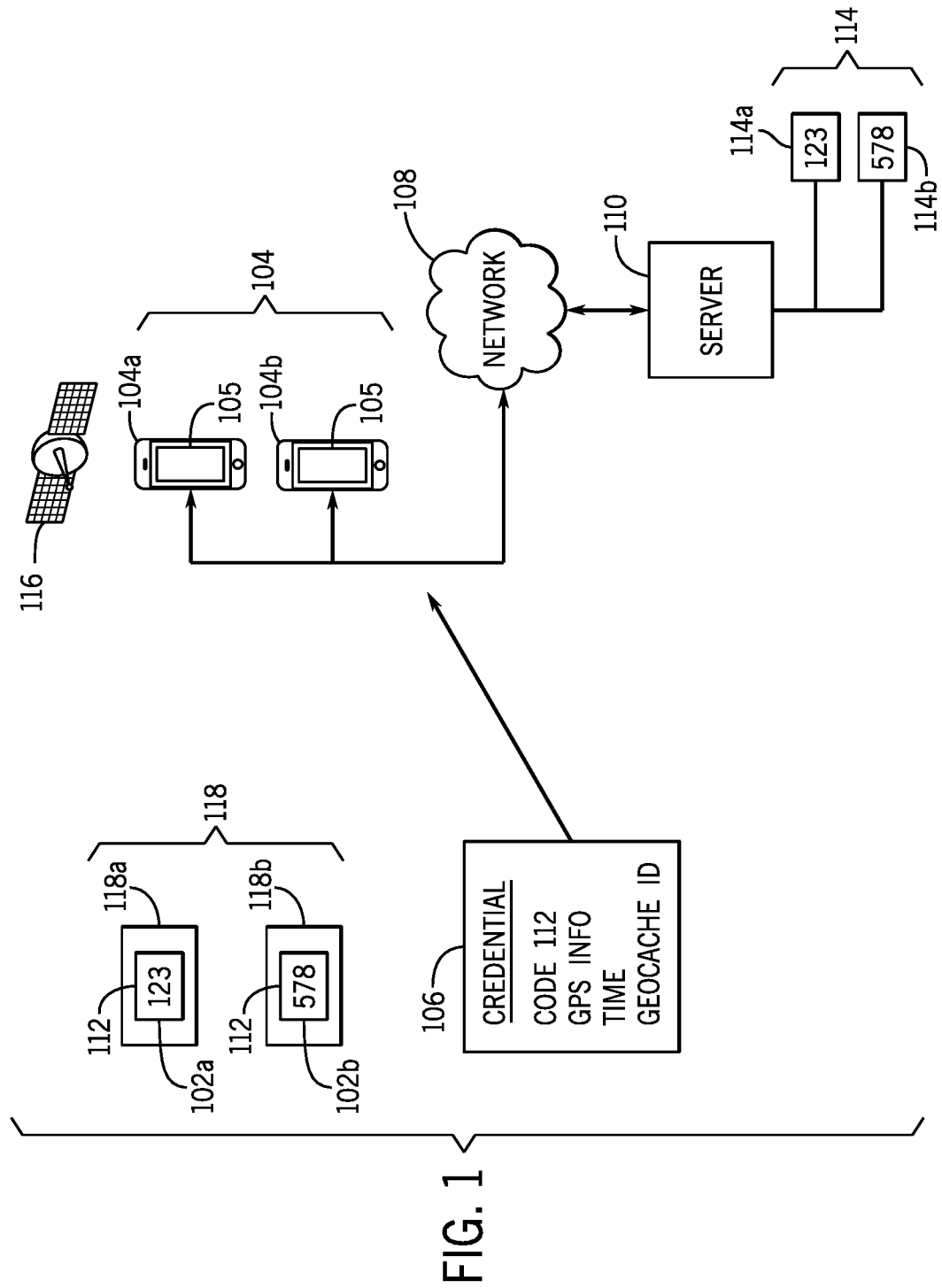
FIG. 1 is a schematic diagram of a system for generating and verifying dynamically varying identifiers for geocaches.

The present disclosure is related to systems and methods to verify discovers of geocaches by seekers, game players, or the like. As used herein, geocache is meant to encompass substantially any type of object hidden in a select location for purposes of being discovered by others, such as part of a game, event, or pastime.

The disclosure includes methods to verify the authenticity of a geocache discovery, i.e., determining that a user did in fact find the selected object at the selected time and location. In one example, a geocache is associated with a verifier that generates a unique, time varying, identifier, such as a dynamic code. The identifier is retrievable by having possession of or physical access to the geocache (including the verifier) at a given time. In some examples, the verifier generates the identifier based on a time signal or other time value and one or more seeds associated with the verifier. The dynamically varying identifier then expires after a certain time, to be replaced with a new identifier. In other words, the identifier may not only be unique to the particular geocache, but also unique to a select instance or interval of time. This dual factor authentication helps to allow verification of a user's possession or location near a select geocache, as well as a time confirmation of the same.

The dynamically varying identifier may be included as part of a target credential or geocache data, including, for example, latitude, longitude, and elevation; time of the putative geocache discovery; and/or a static geocache identifier. The target credential may be captured or stored by a user device, and may be transmitted over a computer network, radio wave transmission, or the like, to a server or database. A validation credential may be generated at the server or verification device based on a received target credential, where the validation credential is synchronized with or otherwise tied to the dynamically varying identifier. Then, the target credential may be compared to the validation credential to determine the authenticity or otherwise confirm that a credential corresponds to the geocache within the selected time interval. Once the authenticity of the identifier is confirmed, the discovering user and other users may receive notification of the confirmed find, as well as any benefits (e.g., points, prizes, or the like) associated with discovery of the geocache.

The time based dynamically varying identifier provides a reliable way to verify the authenticity of the discovery of geocaches, letterboxes, or the like. In conventional methods a geocache "find" identifier is typically static and thus can be easily copied between user devices, allowing non-finding users to simply copy the static identifier (e.g., from online forms or the like) and claim discovering of the geocache. Similarly, ink stamps, passcodes, and the like are subject to similar risks. On the contrary, the time based identifier of the present disclosure helps to ensure that the discovering user was in fact present at the geocache location when the identifier was active and therefore reduces fraudulent "finds" as users attempting to falsify the discovery will be prevented from verifying identifiers where the time does not correspond to the identifier. For example, a time varying, dynamic identifier may be active or unexpired for a 24 hour period or other determined time interval (e.g., 1 hour, 48 hours, 1 week or the like). The interval length may be varied based on preference, as well as, the physical location of the cache. (e.g., remote geocaches may include longer validation intervals to allow a user to reach cell service or Internet to validate the find). Continuing with the example, geocache discovery verifications using the dynamically varying identifier, such as part of a validation credential, within the active time interval (e.g., 24 hour period) will be determined to have discovered the geocache. Users attempting to use the same identifier after the active interval has passed (e.g., over 24 hours), results in an expired identifier and the geocache discovery will not be validated.

Referring to FIG. 1 a system 100 for verifying geocache finds is shown. The system 100 includes one or more verifiers 102 hidden with, integrated into, or otherwise coupled to one or more geocaches 118. Geocaches 118 are any object that is hidden and sought by users 122. In some examples, a user 122 is a private person who hides a geocache, for example as a hobby. In other examples, a user 122 is a company or organization, or a person associated therewith, who hides geocaches as part of a game, business, promotion, or other organized activity. Hiders or other gamers locating the geocaches 118 provide clues or information allowing others to locate a geocache 118. Seekers use the clues or information to attempt to locate the geocache 118. In one example, geocaches 118 include a weather proof or weather resistant container. Geocaches 118 may be camouflaged or otherwise obscured from view to deter discovery by casual passersby. Geocaches 118 may contain objects such as small gifts, stamps, or other trinkets to given as a reward for those who find them. Geocaches 118 may contain travelling objects or travelers that users 122 take from one geocache 118 to another. Geocaches 118 may have a geocache tag or other indicator.

A user 122 may have a user device 104, such as mobile user devices, used to locate and verify geocache discoveries or finds. User devices 104 may be substantially any type of electronic or computer device. User devices 104 may be connected to one or more computer networks 108, such as for example a private cellular telephone network, a local area network, a public network, or the internet. A connection between a user device 104 and a computer network 108 may be continuous, or it may be intermittent. User devices 104 may also receive approximate latitude, longitude, and elevation data from a network, through the use of radio triangulation to one or more beacons of predetermined location. User devices 104 may be connected to one or more networks by wireless, optical, or wired communications. In one example, a user device 104 may be a smart phone, tablet or other held-held computer. User devices 104 may run an application 105, may be in communication with one or more networks 108, may be in communication with one or more global positioning system ("GPS") satellites 116 or other location sensors.

The location sensors or GPS satellites 116 provide location information, e.g., location such as latitude, longitude, elevation, and time, to user devices 104. GPS satellites may be part of a constellation of satellites associated with the U.S.-based Global Positioning System, the Russian-based Glonass system, or other similar satellite constellation. GPS satellites 116 may provide location information to user devices 104 directly through radio waves to compatible receivers within, or in communication with, user devices 104, or they may provide location information indirectly, for example through network 108.

A server 110 may be substantially any type of electronic or computer device connected with a network 108. The server 110 may have a processing element, volatile memory, non-volatile storage, and a user or machine input/output interface. The memory or storage of server 110 may contain data associated with one or more geocaches 118, including location, tag or other indicator, hider, finders, associated verifiers, travelers, clues to their whereabouts, and/or one or more seeds. A seed can be any secret shared between a verifier 102 and the server 110. If the secret is discovered, the seed is compromised and may no longer securely verify a find. In one example, seeds are alphanumeric strings chosen at random. In another example, seeds are alphanumeric values generated using a cryptographically strong pseudorandom generator. In various examples, a seed can be an image, a sound, a color, a number, a word, a shape, a set of solid objects with at least one common characteristic (e.g., piezoelectric crystals, prismatic beams or taught strings that resonate with matched resonant frequencies of any mode), According to one example, seeds are uniquely associated with a verifier, further associated with a geocache. Server 110 may run an application 105. Server 110 may be in communication with one or more user devices 104 via network 108. In one example, server 110 is configured to generate corresponding dynamically varying identifiers 114 to those identifiers 112 of the verifiers 102.

Figure 2:
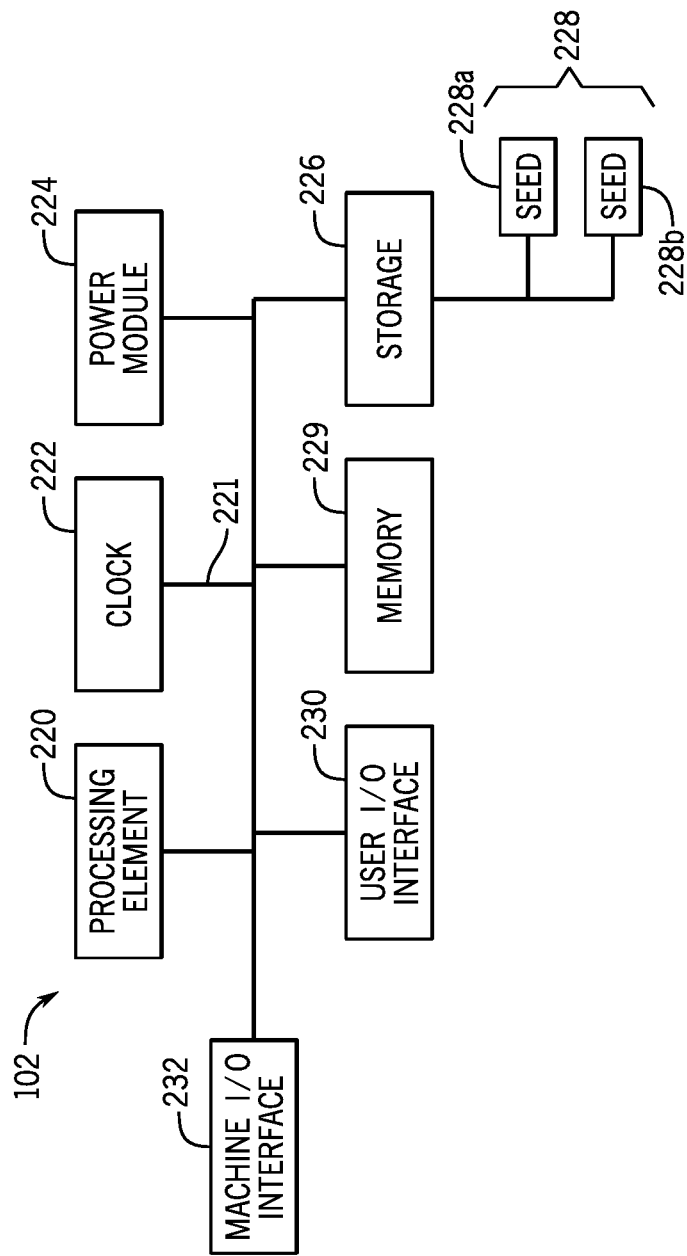
FIG. 2 is a simplified block diagram of a verifier.

Verifiers 102 generate one or more dynamically varying identifiers 112 that are dynamic or otherwise changing over time, such as at select or predetermined time intervals. FIG. 2 illustrates a simplified block diagram of a verifier 102 is shown. As shown in FIG. 2, the verifier may contain one or more processing elements 220, a clock 222, a power module 224, storage 226, memory 229, a user input/output ("I/O") interface 230, and/or a machine I/O interface 232. Each of the various elements may be in communication, either directly or indirectly, with one another and will be discussed, in turn, below. In one example, the verifier 102 is a small battery-operated device with a liquid crystal display capable of generating and displaying dynamically varying identifiers 112. In another example, the verifier 102 is a small battery-operated device with an auditory output that generates dynamically varying identifiers 112.

The processing element 220 is substantially any electronic device capable of processing, receiving, and/or transmitting instructions, including a processor, or the like. For example, the processing element may be a silicon-based microprocessor chip, such as a general purpose processor. In another example, the processing element may be an application-specific silicon-based microprocessor such as a digital signal processor ("DSP"), an application specific integrated circuit ("ASIC"), or an application specific instruction-set processor ("ASIP"). In another example, the processor may be a microcontroller.

The clock 222 is any device capable of keeping time or otherwise measuring time intervals. In one example, clock 222 is a piezoelectric crystal oscillator. In other examples, clock 222 is an atomic clock, radio receiver in communication with a time standard, or any other electrical or mechanical device, and outputting a time signal 121.

The power module 224 supplies power to the components of the various components of the verifier 102 at a desired level and may be either alternating or direct current. Examples may include: a primary battery, which may be single use, a secondary battery, which may be rechargeable, an alternating current to direct current rectifier, direct power connector (e.g., power code to external power supply), a photovoltaic device, a thermoelectric generator, a fuel cell, capacitor (either single or double layer), a wind or water turbine, or any combination of the above devices.

Storage 226 may be any non-volatile computer readable media device. Examples may include: one or more magnetic hard disk drives, solid state drives, floppy disks, magnetic tapes, optical discs, flash memory, electrically erasable programmable read-only memory ("EEPROM"), erasable programmable read-only memory ("EPROM"), ferromagnetic RAM, holographic memory, printed ferromagnetic memory, or non-volatile main memory.

Memory 229 may be any volatile computer readable media device that requires power to maintain its memory state. In one example, memory 229 is random access memory ("RAM"). Other examples may include dynamic RAM, and static RAM. In one example, memory 229 and/or storage 226 store electronic data used or created by processing element 220.

The user I/O interface 230 may be any device that provides for input or output that can interface with a user, such as a liquid crystal display ("LCD"); a light emitting diode ("LED") display; an audio generator such as a speaker; a haptic device that communicates via the sense of touch such as one or more input buttons and/or one or more eccentric rotating mass vibration motors; a sticker, embossing, placard, sign, engraving, or the like, bearing symbols or characters that a user can comprehend; and/or olfactory device that communicates through the sense of smell.

The machine I/O interface 232 provides communication to and from the verifier 102, the user device 104, and/or server 110, as well as other devices. The machine I/O interface 232 can include, a communication interface, such as WiFi, Ethernet, Bluetooth™, near field communication ("NFC"), radio frequency identification ("RFID"), infrared, or the like, as well as other communication components such as universal serial bus ("USB") cables or receptacles, or similar physical connections using conductive wires or fiber optic cables. Machine I/O interface 232 may also be a sticker, embossing, placard, sign, engraving, or the like bearing symbols or characters that a machine can comprehend.

With continued reference to FIG. 2, according to one example, verifier 102 may have a body or enclosure. Generally, the body may be made of a rigid or semi-rigid material that resists deformation when forces are applied and resist ingress of environmental factors such as dirt, debris, and moisture. The body may have a plurality of opposing sides defining an internal volume, containing the above components of the verifier 102. Within the body may be additional internal walls further subdividing the internal volume of the verifier 102 into compartments. In one example, verifier 102 may have an electronics compartment and a power module compartment. In another example, verifier 102 may additionally have a compartment for active power modules currently in use, and an additional compartment for spent power modules.

In one example, the verifier 102 may restrict or prevent removal of a power source once installed within the housing. For example, a verifier 102 may receive a battery in an active compartment (i.e., where it connects electrically to the verifier circuitry) and the active battery compartment may include a tang, spring, fastener, or other such device, such that a battery may be inserted into the compartment from outside the verifier body, but once inside the active compartment, the battery may not be removed from within the internal volume of the verifier 102; it may only be pushed farther into the internal volume or immovable completely. For instance, the battery may be pushed from the active battery compartment within the verifier internal volume to an spent battery compartment, also within the verifier internal volume. In this example, once a battery is installed in a verifier, it cannot be removed outside the verifier 102 body. However, when the battery is depleted, a user may, for example, push the battery from the active battery compartment to the spent battery compartment, opening the active compartment to accept a new battery. But the spent battery may not be removed from the verifier internal volume, ensuring that users cannot access spent batteries without the proper key or other unlocking element (if included). These type of security features help to enable users 122 to replace power sources 224, or perform other maintenance, in exchange for rewards or resources, yet prevent users 122 from stealing power sources 224 from the verifiers 102.

Alternatively, in other examples, the battery sources may include a locking or releasing mechanism to help ensure that they are removed only by designated users and/or at a designated time. For example, the verifier may detect when a battery instance is running low, then activate a supplemental identifier, which may correspond to a battery unlock code or the like, allowing a user to freely access a battery compartment, remove, and/or replace the battery or other power source.

According to another example of the disclosure, the verifier 102 may output a designated type of dynamically varying identifier 112 when its power source 224 needs to be replaced, such as a supplemental identifier that includes both information on the geocache, as well as battery information. In these examples, when a user 122 inputs the designated type of dynamically varying identifier, server 110 may respond with a message offering additional resources, either physical 534 or virtual 532 (discussed below), in exchange for replacing power source 224. After replacement of its power source, 224, the verifier could then generate another type of designated dynamically varying identifier 112 indicating the replacement. A user 122 could then input the new dynamically varying identifier 112 to verify the replacement and receive the offered game resource or resources.

As an example, the dynamically varying identifier 112 may be ephemeral, expiring after a certain time. The duration of the time period in which a dynamically varying identifier expires may vary, be predetermine, or may be static. Further, the duration of the time period may be selected based on various factors, including temperature, the day of the week, location of the geocache, a season, frequency of discovery, the detection of vibrations or other environmental conditions, number of seekers, or the dynamically varying identifier 112 may expire in shorter or longer times for a given verifier. The active time period of a select dynamically varying identifier may be modifiable based on the occurrence or non-occurrence of select events or conditions, e.g., if a verifier is found frequently, the duration of expiration for a dynamically varying identifier may be shortened; or if a verifier is in a difficult-to-reach or remote location, the duration may be longer, allowing a user sufficient time to contact a network 108 to verify the find. In other examples, the dynamically varying identifier 112 may be time varying, or dependent upon time as an independent variable in the creation of dynamically varying identifier 112.

With reference to FIG. 1, methods by which the various parts of the system 100 interact are discussed, according to one example. User devices 104 are configured to receive a dynamically varying identifier 112 from one or more verifiers. The dynamically varying identifier 112 may be combined with other information such as, but not limited to, time information of the capture according to the user device; GPS information such as latitude, longitude, elevation, and/or the GPS time signal according to the one or more satellites 116; and a geocache tag to form a credential 106. The user devices may transmit a credential 106 to a server 110 if a connection to a network 108 is available. If a connection to a network 108 is not available when the credential 106 is formed, the user device 104 may save the credential 106, such as in either volatile or non-volatile computer readable media. Then, once a connection to a network is restored, the user device automatically, or manually upon input from a user 122, transmit the credential 106 to a server 110.

User devices 104 may receive dynamically a varying identifier 112 supplied via either the user I/O interface 230, or the machine I/O interface 232, by any method available. In one example, verifier 102 displays a dynamically varying identifier 112 on a visual display of the user I/O interface 230 and the user 122, upon perceiving dynamically varying identifier 112, inputs the identifier manually into the user device 104 (e.g., enters numbers/letters via a capacitive touch screen on the user device 104). According to another example, verifier 102 a displays dynamically varying identifier 112 on a visual display of the user I/O interface 230 and a camera or sensor on user device 104 captures an image of a dynamically varying identifier 112, which may then be decoded or stored by the user device 104. In this example, the dynamically varying identifier 112 may be either user readable (e.g., alphanumeric, colors, shapes, etc.) machine readable (e.g., a QR code, bar code or the like), or both. According to other examples, verifier 102 transmits dynamically varying identifier 112 to user device 104 by wireless communications such as WiFi, Ethernet, Bluetooth, NFC, RFID, USB, or the like.

Figure 3:
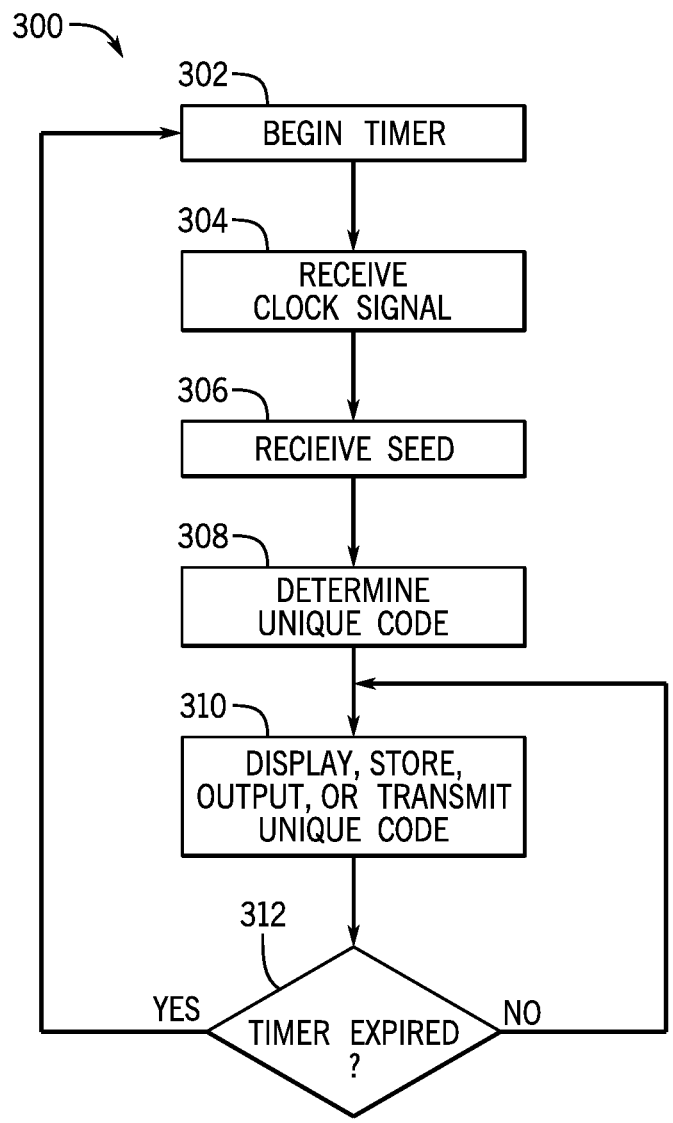
FIG. 3 is a flow chart illustrating a method of generating a dynamically varying identifier for a geocache.

FIGS. 1, 2, and 3 disclose, a method 300 of generating a dynamically varying identifier 112 for use with the verifier 102. In another example, the timer may be executed on a server 110. In operation 302, a timer begins. The timer may be executed on a processing element and be any operation that can account for the lapse of time, and compare that lapse to an expiration threshold, in any increment. In one example, the timer begins in the on-board processing element 220 of a verifier 102. The processing element may receive a first value of a time signal 221 from clock 222 and write it to memory 229 or storage 226. For example, a first value of the time signal may be, "10:00:00 AM, Nov. 13, 2018 Greenwich Mean Time." In another example, the first value of a time signal may be, "0 milliseconds."

In operation 304, a second value of a time signal 221 is received from a clock 222 by a processing element 220. For example, the second value of the time signal may be, "10:00:01 AM, Nov. 13, 2018 Greenwich Mean Time." In another example, the first value of a time signal may be, "1 millisecond." In one example, processing element 220 may write the second value of the time signal 221 to memory 229 or storage 226.

In operation 306 a seed 228 is received by a processing element 220 from memory 229 or storage 226. For example, storage 226 may be configured to contain one or more verifier seeds 228a, 228b. Verifier seeds 228a, 228b are unique to each verifier 102 and are used by processing element 220, along with time information, to generate a dynamically varying identifier 112 for the verifier 102.

In operation 308, a dynamically varying identifier 112 is determined. In one example, processing element 220 uses the second value of a time signal 221 (e.g., after retrieving it from memory 229 or storage 226 or the like), and seed 228 in a mathematical or other relationship combination to generate seed 228 for verifier 102. In one example, the mathematical combination of seed 228 and the value of a time signal 221 is such that dynamically varying identifier 112 has a low probability of being duplicated for each combination of seed 228 and each value of a time signal 221.

For example, the seed 228 may combine with a value of a time signal "10:00:00 AM, Nov. 13, 2018 Greenwich Mean Time" to form dynamically varying identifier 112 "302HYD". The same seed, combined with a different value of a time signal 221, for instance "10:01:00 AM, Nov. 13, 2018 Greenwich Mean Time" may result in a different dynamically varying identifier 112, for instance, "029DKS". In another example, the time signal is Unix epoch time, or the number of seconds elapsed since Jan. 1, 1970 at 00:00:00, UTC. In another example, the dynamically varying identifier is a time-based one-time password such as is defined by Internet Engineering Task Force Standard RFC 6238. In this example, the dynamically varying identifier is generated from a truncated output of an SHA-1 cryptographic hash function. Inputs to the function are the seed 228 and the value of a time signal. In another example, the server dynamically varying identifier 114 is determined for use by a server 110, associated with a second value of time signal 221 and a seed 228.

In operation 310, dynamically varying identifiers 112 or 114 may be stored and/or transmitted. In one example, dynamically varying identifier 112 or 114 may be stored in memory 229, or storage 226 and/or the dynamically varying identifiers 112 or 114 may be outputted to a user I/O interface 230, a machine I/O interface 232, or both. In one example, dynamically varying identifiers 112 or 114 may be displayed as alphanumeric values, symbols, or the like, on an LCD or other visual display. In another example, dynamically varying identifiers 112 or 114 may be displayed as one or more non-alphanumeric symbols that may be user readable or machine readable. For example, dynamically varying identifiers 112 or 114 may be displayed as a barcode, QR code, or the like. In another example, dynamically varying identifiers 112 or 114 may be displayed as colored shapes (either filled with color or devoid of color with colored edges), for example, a green triangle or a red square. In another example, dynamically varying identifiers 112 or 114 may be displayed as shapes without colors.

In operation 312, the processing element 220 determines whether the timer has expired. For example, the processing element 220 may receive a third value of the time signal 221 from the clock 222. For example, a third value of the time signal 221 may be "10:01:00 AM, Nov. 13, 2018 Greenwich Mean Time." The processing element 220 may retrieve the first value of the time signal 221 from memory 229 or storage 226 and compare it to the third value of the time signal 221. The processing element 220 may compare the first value of the time signal 221 and the third value of the time signal 221 to determine an elapsed time. For example, "10:01:00 AM, Nov. 13, 2018 Greenwich Mean Time" minus "10:00:00 AM, Nov. 13, 2018 Greenwich Mean Time" equals one minute elapsed. The processing element 220 may compare the elapsed time with an expiration threshold, for example, "1 minute". In another example, the timer may determine an elapsed number of milliseconds. For instance, if the first value of the time signal 221 is 0 milliseconds and the third value of the time signal 221 is 1000 milliseconds, the elapsed time would be 1000 minus 0 equal 1000 milliseconds. If the lapsed time since the timer started has met or exceeded the expiration threshold, the timer has expired. In the above example, one minute has elapsed, and the timer has expired. If the timer has not expired, the method returns to operation 310, continuing to store, output or display the dynamically varying identifier 112 or 114. If the timer has expired, the method returns to operation 302, to determine new dynamically varying identifiers 112, 114.

Figure 4:
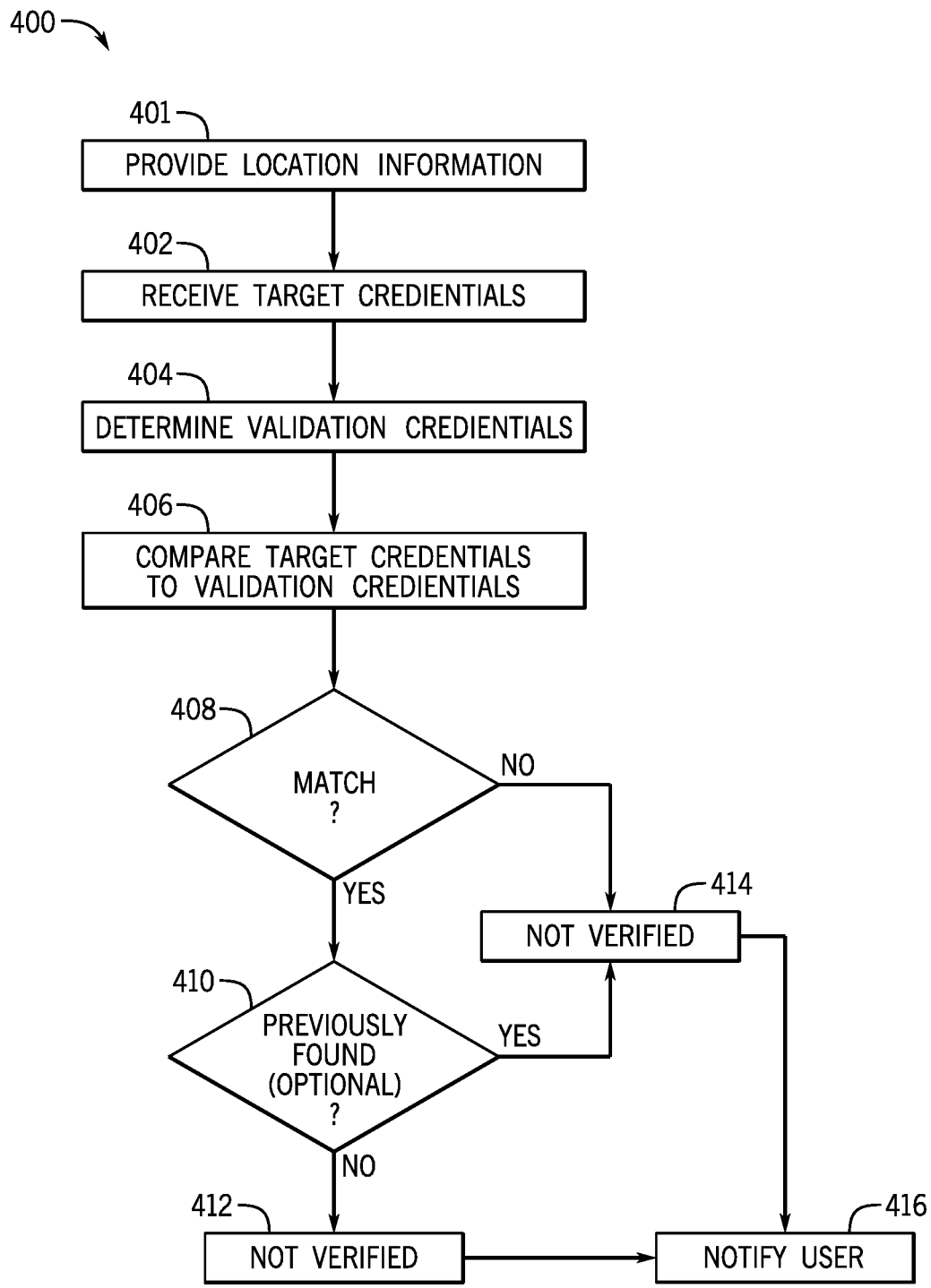
FIG. 4 is a flow chart illustrating a method of receiving and verifying a dynamically varying identifier for a geocache.

FIGS. 1 and 4 illustrate, a method 400 for verifying geocache discoveries. According to one example, method 400 may be executed on a user device 104 with or without a connection to a network 108. Method 400 may be executed partially on a user device 104 and partially on a server 110, in any combination. User device 104 and the server 110 may be in active communication when executing method 400, or they may have an intermittent or delayed communication.

Method 400 may begin with operation 401 where location information associated with a geocache is received by a user 122. In one example, the location information may be received by the user from server 110 over network 108 by a user device 104. For example, user 122 may access a web site hosted by server 100 listing various geocaches 118, along with location information on how to find them. In another example, the user may receive location information from a server 110 and may write it down, for instance on a piece of paper that the user takes to search for geocache 118. For example, the location information may be latitude, longitude, altitude, city information, location name or number (e.g., corresponding to a specific location within a game or the like), or other information corresponding to a virtual or physical location. The location information may also be in the form of a set of instructions or clues with a starting point, various landmarks, various direction or bearing and distance vectors, and an end point. For example, the location information could be instructions such as: begin at the fire hydrant at the 200 block of South Muhlenberg Street; walk 42 paces on a bearing of 15 degrees west of north; locate an old tree stump; etc.

After a user 122 finds a geocache 118, the user 122 may verify the find. In operation 402, a credential 106 is received from a user device 104 by a server 110 for a target geocache 118. For example, a user 122 may manually observe dynamically varying identifier 112 on a user I/O interface of verifier 102 associated with geocache 118. The user 122 may manually input the dynamically varying identifier 112 into an application 105 running on a user device 104. For example, a verifier dynamically varying identifier 112 in the form of alphanumeric characters, "302HYD" may be displayed on an LCD display by verifier 102 for a specified time. User 122 may type the characters "302HYD" into an input field on an application running on a user device such as a smart phone. In another example, a user device 104 may use one or more sensors to capture dynamically varying identifier 112 from either user I/O interface 232 and/or machine I/O interface 230. For example, a user device 104 may use a camera to capture an image of dynamically varying identifier 112 displayed on the user interface 232 such as an LCD display, in the form of a QR code, barcode, or alphanumeric characters. In another example, a user device 104 may capture dynamically varying identifier 112 from machine I/O interface 232 using wireless communications such as NFC, Bluetooth, or WiFi. In another example, a user device 104 may capture dynamically varying identifier 112 from machine I/O interface 232 using electrical communications such as USB or Ethernet. In another example, the user may manually record a dynamically varying identifier 112 by recording it, for instance, on a piece of paper, a secondary user device, capturing an image with a camera, or the like. The user may later submit the dynamically varying identifier 112 to server 110 for verification for instance by typing it into an input field on a server web site.

Continuing operation 402, the user 122 may then cause the dynamically varying identifier 112 to be combined with other information from a user device 102 to form a target credential 106 containing information related to a target geocache 118 that a user 122 has found. According to one example, the credential 106 may include time information associated with when a user 122 located the target geocache 118; information related to the latitude, longitude, and elevation of the user device 104 at the time the geocache 118 was found, a geocache tag, and one or more verifier dynamically varying identifiers 112. The user 122 may then cause user device 102 to send the target credential 106 to server 110 via network 108. In one example, user device 104 is in communication with server 110 via network 108 contemporaneously with the discovery of the geocache 118. In another example, a user device 104 is not in communication with server 110 contemporaneously with the discovery of the geocache 118, and stores credential 106 for a later time when communications to server 110 are restored. Once communication to server 110 is restored, user device 104 may transmit a stored credential 106. In another example, the user may record information to form the credential 106. For example, the user may write, photograph, type, or memorize the information. The user may submit the written information to server 110, for instance by typing it into an input field on a server web site.

In operation 404, validation credentials are determined by one or more computing devices, e.g., a server 110. Server 110 may use time information associated with the geocache 118 find from credential 106, and a master seed 228 to determine a validation credential. In one example of operation 404, server 110 or a user device 104 may have records associating geocache tags with verifier seeds 228. Server 110 may use records to determine one or more master seeds 228a, 228b associated with the geocache tag in credential 106. Server 110 may use master seeds 228, and time information from credential 106 to determine one or more server dynamically varying identifiers 114. In one example, server 110 may use method 300 to determine one or more server dynamically varying identifiers 114 forming part of the validation credential. Continuing the example from operation 402, if server 110 receives a target credential 106 containing verifier dynamically varying identifier "302HYD", the server 110 may use time information from credential 106 and master seed 228 to determine server dynamically varying identifier 114 as "302HYD". If, however, the time information from target credential 106 is incorrect, meaning that seed 228 and time information would not have mathematically combined (or other predefined relationship) according to method 300 to result in verifier dynamically varying identifier 112 "302HYD", the server may determine a different server dynamically varying identifier 114, such as "029DKS", for instance.

In operation 406, according to one example, the authenticity of a verifier dynamically varying identifier 112, associated with credential 106, is determined by a server 110 relative to server dynamically varying identifier 114. In one example, server 110 may compare verifier dynamically varying identifier 112 to server dynamically varying identifier 114 to determine if they are the same. Continuing the example above, the user 122 may have been within proximity of the verifier 102 at the time value that, when mathematically combined with seed 228 according to method 300, would result in a server dynamically varying identifier 114 equal to "302HYD". In these instances, the geocache 118 find is verified because the verifier dynamically varying identifier 112 from the target credential 106 and the server dynamically varying identifier 114 from the validation credential are the same. Continuing the example, if, however the user 122 were not in proximity to the verifier 102 at the time value associated with verifier dynamically varying identifier 112 equal to "302HYD", the server will determine a server dynamically varying identifier 114 that is different from "302HYD", perhaps "029DKS", or any other set of characters according to method 300.

In another example of operation 406, server 110 may validate the time information received as part of a target credential 106 by determining prior values of server identifier 114 associated with prior time values, and comparing those prior time values to the time information in credential 106. In one example, the server 110 determines server identifiers 114 based on the present time; and/or prior time values; and the seed 228 for a particular verifier 102 for which it received a target credential 106. The server 110 may start with the present time, and work backward to prior time values in fixed steps. The fixed steps may be equal to the timer expiration threshold of method 300. At the prior time values, the server 110 determines a prior server identifier 114 and compares it to the verifier identifier 112. The server continues backward in time until it finds a prior server identifier 114 matching the verifier identifier 112 within the target credential 106. The server 110 then compares the prior time value that resulted in the matching prior server identifier 114, to the time information received in the target credential 106. The server 110 then validates the time information received in the target credential 106. For example, suppose the server 110 receives a target credential 106 that includes a verifier identifier 112 equal to "302HYD", a seed 228, and time information of "10:00:00 AM, Nov. 13, 2018 GMT", associated with a find of a geocache 118 containing verifier 102. If the server 110 is processing operation 406 at "10:30:00 AM, Nov. 13, 2018 GMT", the server 110 determines a server verifier 114 using the present time of 10:30 AM, and the seed 228 for the verifier 102. If the resulting server identifier 114 does not match "302HYD" for the present time of 10:30 AM, the server 110 determines a prior server identifier 114 for "10:29:00 AM", in a case where the timer expiration threshold is one minute. If the prior server identifier 114 is not "302HYD" the server 110 continues determining identifiers 114 back into the past until a matching prior server identifier 114 is found, or some threshold of backward time is reached. If, for example, a prior server identifier 114 of "302HYD" is found with a prior time value of "10:00:00 AM, Nov. 13, 2018 GMT", the server 110 compares that prior time value to the time information in the target credential of, "10:00:00 AM, Nov. 13, 2018 GMT" and finds they are equal. The server 110 determines that the time information in the target credential is valid. If however, the server 110 finds a matching prior server identifier 114 at a prior time different than "10:00:00 AM, Nov. 13, 2018 GMT", the server 110 determines that the time information in the target credential is not valid. Likewise if the server 110 fails to find any prior server identifier 114 matching "302HYD", the time information and the verifier identifier 112 are determined to be not valid.

In operation 408, according to one example, if the verifier dynamically varying identifier and the master identifier 114 match, the server moves to operation 412 where the user 122 is determined to have found the target geocache 118. The server 110 may make a record of either a successful find, or an unsuccessful find.

Optionally, the server 110 may, in operation 410, determine whether the user 122 has previously found the target geocache, or previously found the target geocache within a certain timeframe. Based on that determination, the user 122 may be barred from being determined to have found the target geocache. If in operation 408, the verifier dynamically varying identifier 112 is not authentic relative to the master identifier 114, the user 122 is determined not to have found the target geocache in operation 414. Operations 412 and 414 may proceed to operation 416 wherein a user is notified whether, or not, the geocache discovery is verified.

Having more than one seed 228 (e.g., seeds 228a, 228b) associated with a verifier 102 may provide a backup feature in the event a server 110 is compromised by a security breach, physical damage, or the like. For instance, if one set of seeds 228a were to be leaked to the public, dynamically varying identifiers 112 could be falsified or forged. A backup, or secondary set of seeds 228b may then be used, thereby maintaining the authenticity of geocache 118 discoveries, while obviating the need to replace geocaches already deployed.

According to one example of the disclosure, methods 300 and/or 400 may be executed on one or more verifiers 102, one or more servers 110, one or more user devices 104; or any combination thereof. Additionally, individual operations within methods 300 and 400 may be executed on different devices of the same type, (e.g., multiple servers 110 may execute different operations of the methods disclosed), and/or different devices of different types, (e.g., some operations of the methods may be executed on one or more servers 110, while other operations of the same method may be executed on one or more user devices 104, one or more verifiers 102, or one or more servers 110).

According to another example of the disclosure, methods 300 and 400 may be executed by an application or program 105 stored in a non-transitory machine-readable medium and executed by a processing element of a user device 104. The application 105 may perform any or all of the operations of methods 300 and/or 400. The application 105 may operate while in communication with a network, 108. Alternately, the application 105 may use transitory, or non-transitory, machine-readable medium of user device 104 to store information relating to any part of methods 300 and/or 400. The application 105 may operate, for example in an off-line mode, without a connection to a network 108. The application 105 may store information, for example information forming credential 106, and transmit the same over a network 108 when the network 108 becomes available.

With reference to FIGS. 1, 2, and 4, according to another example, user device 104 may receive a static identifier 107 located on, or attached to, the one or more verifiers 102. The static identifier 107 may be any alphanumeric code or other symbol that uniquely identifies a verifier, or is associated with one or more seeds. For example, a static identifier 107, may be a bar code, a matrix code (e.g., a QR code), or a string of alphanumeric characters such as numbers, letters, or symbols. Static identifier 107 may be outputted from the verifier by either a user I/O interface 230, or a machine I/O interface 232. According to another example, the timer of operation 302 may execute on the user device 104, rather than a verifier 102. The clock and time signal of operation 304 may, likewise be provided by one or more user devices 104. In operation 308, verifier dynamically varying identifier 112 may be generated by the user device 104, given one or more seeds 228 from the verifier 102 via a static identifier 107, and GPS information may be supplied from the user device 104. GPS information may be used in combination with other information, such as a geocache tag; time information; one or more seeds 228; to form credential 106. Credential 106 may include the user's location within a proximity to the geocache 118 and or verifier 102. In operation 310, the one or more dynamically varying identifiers 112 may be outputted to physical or machine I/O interfaces of user device 104, and they may be transmitted to a server 110. Alternately, dynamically varying identifiers may be transmitted to server 110 without output to an I/O interface. Operation 312 may proceed on a user device 104, similarly to how it would on a verifier.

With reference to FIGS. 1, 2, and 3, according to one example, an application 105 may reside on a server connected to the internet, or another network 108, such as server 110. In this example, application 105 may be accessed by any means for accessing internet resources, such as activating a hyperlink, scanning a static identifier 107 or capturing a dynamically varying identifier 112 with a user device 104, typing a universal resource locator ("URL") into a browser. Application 105 may have lists of geocaches 118 hidden, and their associated data.

According to one example, the application 105 may allow users to create one or more associated accounts to link their verified discoveries of geocaches 118. User accounts may contain information associated with users 122, such as a display name visible to other users, methods enabling communication among users 122, lists of geocaches 118 hidden or discovered, lists of virtual and physical resources awarded to users 122, social groups to which users belong, photos of geocache 118 discoveries, and other information. Users 122 may be able to update parts of their associated information without losing track of their other associated information, such as geocache 118 discoveries. Application 105 may allow users 122 to verify a discovery without creating an account, but allow them to link a display name to the discovery.

According to one example, application 105 may include one or more input fields allowing a user 122 to input one or more dynamically varying identifiers 112 associated with a particular geocache 118 bearing static identifier 107. Dynamically varying identifier 112 may then be verified according to method 400. This example may be useful in environments where there are multiple geocaches 118 in close proximity to one another, or other situations in which users 122 may not be sure which geocache 118 they have found, or found a geocache they were not looking for. The static identifier 107 may then direct users 122 to the appropriate input fields within application 105 to input dynamically varying identifier 112, for a particular geocache 118. Static identifier 107 may include information such as a geocache tag, seeds 228, placement information of the geocache (i.e., information concerning where a geocache is supposed to be), and other information. The application 105 may, upon receiving a static identifier 107 bearing placement information, compare that placement information to GPS information received from a user device 104, for example, as part of target credential 106, to determine whether a geocache 118 has been moved.

With continued reference to FIGS. 1, 2, and 3, according to one example, application 105 may be a web-based application program interface ("API"). The application 105 may allow other systems to link to an embodied system of the disclosure. Such a link could allow other systems to verify geocache 118 discoveries, display a log of finders, display geocache 118 and traveler 536 (discussed below) locations. Furthermore, application 105 embodied as an API could let others develop games around the system of the present disclosure such that the resources attributed to a discovery may have value within the other game.

Figure 5:
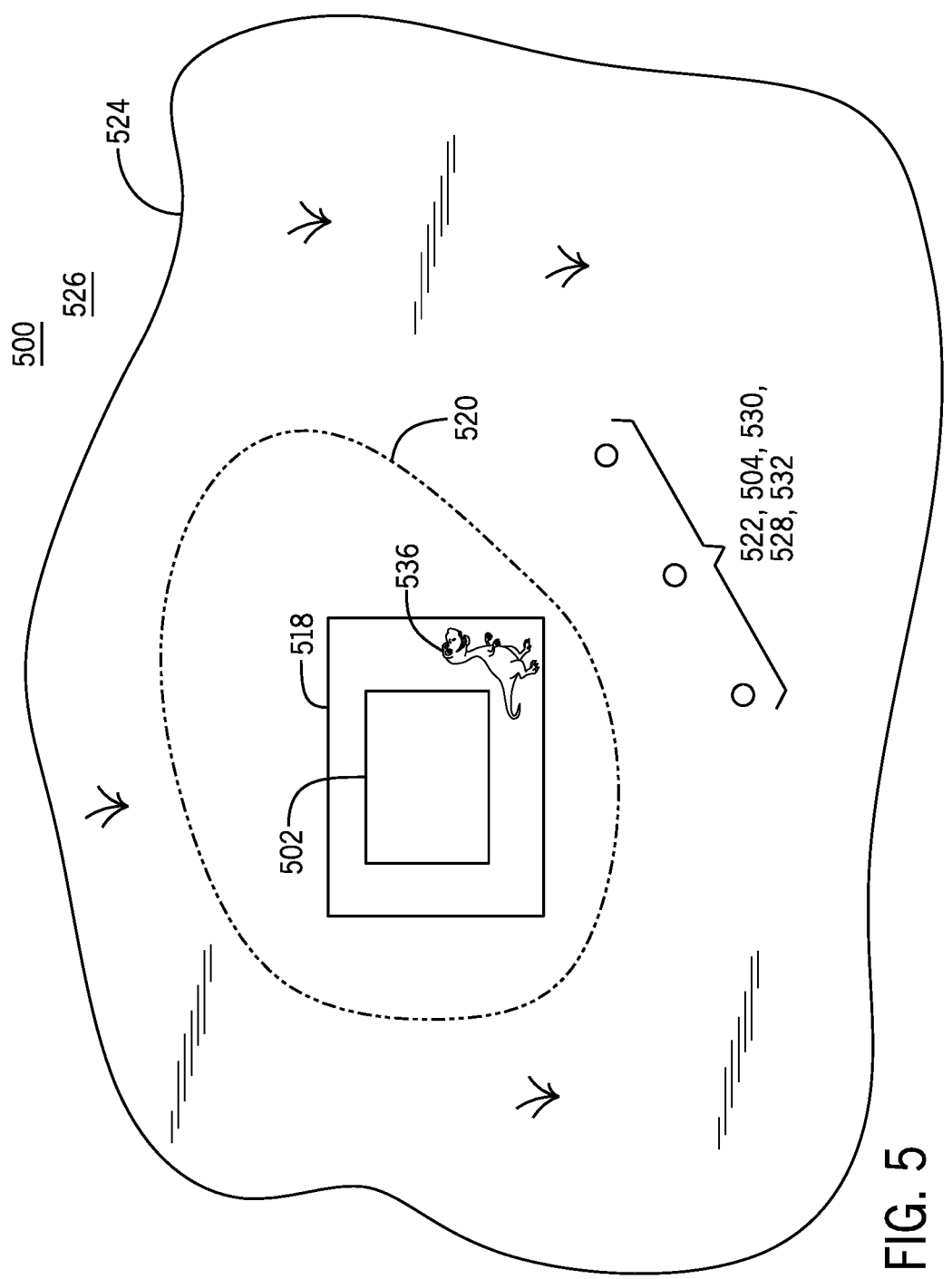
FIG. 5 is a simplified plan view of a map of a game using geocache with dynamically varying identifiers utilizing the methods of FIGS. 3 and 4.
Figure 6:
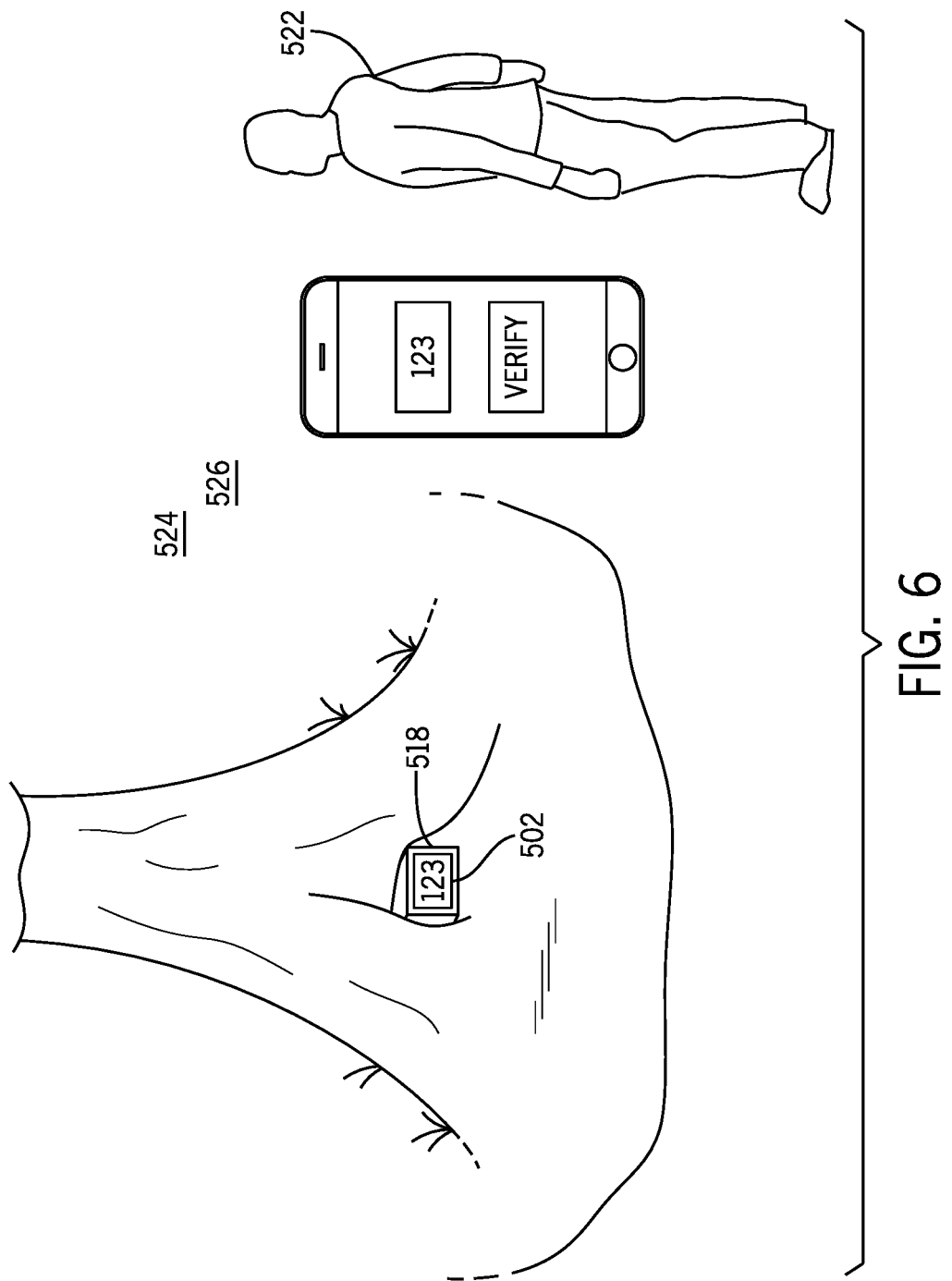
FIG. 6 is a perspective view of a user finding and verifying a geocache with a dynamically varying identifier.

FIGS. 5 and 6, disclose a simplified view of a game 500 according to one example. FIG. 5 shows a simplified plan view of a game. FIG. 6 shows a perspective view of a user 522 playing game 500. Game 500 may take place in both a physical world 526, and a virtual world 530. Physical world 526 may have one or more game fields 524. Likewise virtual world 530 may have one or more virtual game fields 528. In one example, game 500 includes one or more users 522 having one or more user devices 504. One or more geocaches 518, having one or more verifiers 502, are hidden within the game field 524. Users 522 may utilize user devices 502 to locate the one or more geocaches 518. Users 522 may verify finding the one or more geocaches 518, according to the systems and methods disclosed herein. The physical game field 524 may be overlaid with one or more virtual barriers 520. Examples of virtual barrier 520 may include, a geofence, substantially by one or more latitude, longitude, and or elevation points. A user's 522 proximity to, presence within or without a virtual barrier 520, may be included in credentials 106 (see, e.g., FIG. 1.) to further verify the accuracy of a geocache 518 discovery.

According to one example of the disclosure, game 500 may blend a physical world 526 with a virtual world 530 in which users 522 play characters, which may be represented by avatars. The virtual game may be housed on a server, like server 110 (see FIG. 1) or a different server. Users 522 may interact with both the physical 526 and virtual 530 worlds via user devices 504. In one example, users 522 may be given goals to achieve in the virtual world 530 of game 500, that include finding the one or more geocaches 518 in the real world. When a user 522 finds a geocache and verifies the discovery according to the methods disclosed, the server 110 may award one or more virtual game resources 532 to users 522 in the virtual world as a result of achieving a goal in the physical world. For instance, users could receive virtual game currency, an amount of a virtual currency convertible to real currency (e.g., bitcoin and the like), credit, money or objects. Likewise users 522 may, upon making a verified discovery of a geocache 518, receive one or more physical game resources 534 in the physical world 526. For instance, users could receive real, physical currency, credit, money or objects to further achieve goals of the gameplay.

Physical 534 or virtual 532 resources may be varied in the value rewarded based on a number of factors. For example, geocaches 118 may be rated by difficulty of discovery, with more difficult-to-find geocaches 518 allowing for greater resources upon discovery. For instance, if a geocache 518 requires scuba gear, or is placed on a cliff-face, or in a cave, discovery of that geocache 518 could be comparatively more rewarding than discovery of one in a local public library. The application 105 may calculate a difficulty score automatically upon placement of a geocache, based on GPS information such as elevation, latitude, longitude, or changes in these relative to a baseline. Additional physical 534 or virtual 532 game resources may be reduced for subsequent discoveries by the same user. By way of further example, geocaches 518 may be given higher value when discovered at specific times. For instance, a retailer could place a number of geocaches 518 with in a physical store, and reward users who discover geocaches 518 during certain hours of a sale, with additional discounts, prizes, coupons, or the like. By way of further example, verification of the discovery of geocache 518 may be awarded more virtual 532 or physical 534 resources, the longer a geocache 518 remains un-discovered, or based on a frequency of discovery. For instance, if a geocache 518 is normally found once per week, its discovery may result in comparatively little virtual 532 or physical 534 resources. On the other hand, the verified discovery of a geocache 518 that is normally found only once per year may result in virtual 532 or physical 534 resources that are comparatively higher than the more frequently discovered geocache 518. In another example, users 522 could receive game resources, either physical 534 or virtual 532 as a reward for placing a new geocache 518 and verifying its placement. In another example, a user 522 who places a new geocache 518 could receive virtual 532 or physical 534 resources when other users find the new geocache 518.

With continued reference to FIGS. 5 and 6, according to one example of the disclosure, a geocache 518 may contain one or more traveling objects 536 ("travelers, trackables, or geocache bugs") intended to travel between geocaches 518. Some examples of travelers may be dolls, trinkets, dogtags, coins, toys, and other similar objects. Travelers 536 may have one or more verifiers 502 attached to, or embedded within them. Users 522 may be given a task of moving a traveler 536 from one geocache 518 to another geocache 518, and receive virtual 532 or physical 534 resources in exchange for making progress toward, or completing a task. More progress toward the goal, may result in a greater award of virtual 532 or physical 534 resources. For example, a user may, according to the methods and systems disclosed, verify that a traveler 536 was discovered at the location of one geocache 518 within proximity to one or more virtual barriers 520, and was deposited some time later at a different geocache 518 within proximity of another one or more virtual barriers 520. For example, a user 522 may locate a first geocache 518 and verify its discovery using the methods and systems disclosed, including transmitting the credential 106 associated with the geocache to server 110. The user 522 may then open the geocache 518 and locate a traveler 536, which has its own verifier 502, and generate a first traveler credential 106 for the traveler 536. The user 522 may then proceed with the traveler 536 to a location of a second geocache 518. The user 522 may then verify the discovery of the second geocache 518 by transmitting its credential 106 to server 110. The user 522 may then transmit a second traveler credential 106 associated with the traveler 536 to server 110. The first traveler credential 106 may be different from the second traveler credential 106 at least because the dynamically varying identifier 112 associated with the first traveler credential 106 and the dynamically varying identifier 112 associated with the second traveler credential 106 may be different, having been generated at different times, and/or different locations.

According to one example of game 500, the game may have a limited envelope of play. A limited envelope of play may include game 500, as described, but with certain limits imposed, such as a limited time; space; an allocation of virtual 532 or physical 534 resources; a subset of geocaches 518; or a subset of users 522. For example, an envelope may be time limited with a discrete beginning and end, in order to foster competition to accumulate the most virtual 532 or physical 534 resources with an allotted time period. In such an example, resources may reset or expire at the beginning of the limited envelope. According to another example of game 500, a limited envelope of play may include challenges within social groups of users 522 (e.g., friends, families, or the like), such that the field of competition is narrowed or selected among the various users 522. In such an example, virtual 532 or physical 534 resources may only be compared between group members to determine a winner, rather than by comparison to the set of all users 522. According to another example, an envelope of play may include a tour, such as through a museum, zoo, park, store, or other location, where users 522 have the goal of finding all of a subset of geocaches 518 within the tour location, or starting with one geocache 518 and leading to another, in sequence.

According to another example, geocaches 518 may be divided among one or more user groups. The groups of users 522 may either hide geocaches 518 themselves, or be given the locations of their respective geocaches 518. According to this example, game 500 may proceed similarly to a game of capture the flag, with virtual 532 or physical 534 resources awarded to one group for discovering the geocaches 518 of a different group. The resources so awarded may be taken from the group of users 522 whose geocaches 518 have been discovered.

CONCLUSION

The methods and systems are described herein with reference to a system for verifying geocache finds. However, these techniques are equally applicable to similar activities of hiding and seeking objects, such as benchmarking, trigpointing, treasure-hunting, letterboxing, waymarking, and the like.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims. Any references to singular gender-specific references, such as his, he, her or she are to be construed as gender-neutral, imparting no limitations on the gender nor quantity of users.

One skilled in the art will understand that the following description has broad application. For example, while examples disclosed herein may focus on user devices, servers and verifiers, it should be appreciated that the concepts disclosed herein apply equally to any other computing device that may analyze/process electronic signals. Accordingly, the discussion of any example is meant only to be exemplary and is not intended to suggest that the scope of the disclosure, including the claims, is limited to these examples.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

I claim:

1. A method for verifying a discovery of a geocache positioned at one or more physical locations, the method comprising:

providing a first location information corresponding to a geocache located at a first physical position;
generating, with a verifier disposed with the geocache at the first physical location, a dynamically varying identifier associated with the geocache;
receiving from a user device the dynamically varying identifier;
determining a validation credential associated with the geocache;
comparing the dynamically varying identifier with the validation credential;
determining whether the geocache was discovered, based on the comparison of the dynamically varying identifier with the validation credential
expiring the dynamically varying identifier after an elapsed time based on a time signal;
replacing the dynamically varying identifier with a new dynamically varying identifier; and
notifying a user whether the discovery of the geocache is verified.

2. The method of claim 1, wherein the dynamically varying identifier is included in a target credential, the target credential further comprising a static identifier that uniquely identifies the verifier.

3. The method of claim 1, wherein the dynamically varying identifier is included in a target credential, the target credential further comprising the first location information and a second location information associated with another physical location to which the user has moved the geocache.

4. The method of claim 1, wherein the dynamically varying identifier is included in a target credential, the target credential further comprising a time information associated with the discovery.

5. The method of claim 1, wherein the elapsed time is one of fixed or variable.

6. The method of claim 1, wherein the dynamically varying identifier expires based on an occurrence of a condition in addition to a lapse of time.

7. The method of claim 1, wherein the dynamically varying identifier is determined based on a seed, the seed comprising a secret shared between the verifier and a server.

8. A system for verifying discovery of a geocache comprising:

a geocache containing a verifier that:
generates a dynamically varying identifier associated with the geocache,
expires the dynamically varying identifier after an elapse of time based on a time signal, and
replaces the dynamically varying identifier with a new dynamically varying identifier;
a user device that stores information related to the dynamically varying identifier, and generates a target credential, wherein the target credential includes location information associated with the geocache; and
a server that receives the target credential, determines a validation credential associated with the geocache; compares the dynamically varying identifier with the validation credential; and determines whether the geocache was discovered based, at least in part, on the comparison of the dynamically varying identifier and the validation credential.

9. The system of claim 8, wherein the target credential further comprises a static identifier that uniquely identifies the verifier.

10. The system of claim 8, wherein the target credential further comprises a time information associated with the discovery.

11. The system of claim 8, wherein the dynamically varying identifier expires based on an occurrence of a condition other than the lapse of time.

12. The system of claim 8, wherein the dynamically varying identifier is determined based on a seed, the seed comprising a secret shared between the verifier and the server.

13. The system of claim 8, wherein the geocache contains a traveler comprising another verifier.

14. A game comprising:
   a geocache containing a verifier, the verifier configured to:
      generate a dynamically varying identifier associated with the geocache,
      expire the dynamically varying identifier after an elapse of time based on a time signal, and
      replace the dynamically varying identifier with a new dynamically varying identifier;
   a device configured to capture the dynamically varying identifier, and generate a target credential, wherein the target credential includes location information associated with the geocache;
   a network in communication with the device, the network configured to transmit the target credential;
   a server in communication with the network, the server configured to receive the target credential, determine a validation credential associated with the geocache; compare the dynamically varying identifier with the validation credential; determine whether the geocache was discovered based, at least in part, on the comparison of the dynamically varying identifier and the validation credential; and award a virtual or physical game resource.

15. The game of claim 14, wherein the user device is further configured to determine a validation credential associated with the geocache; compare the target credential with the validation credential; determine whether the geocache was discovered; and award a virtual or physical game resource.

16. The game of claim 14, wherein the game comprises a limited envelope of play.

* * * * *